(12) United States Patent
Park

(10) Patent No.: US 10,474,406 B2
(45) Date of Patent: Nov. 12, 2019

(54) METHOD OF PRINTING CONTENT SHARED BETWEEN APPLICATIONS AND COMPUTING APPARATUS TO PERFORM THE METHOD

(71) Applicant: HP PRINTING KOREA CO., LTD., Suwon-si, Gyeonggi-Do (KR)

(72) Inventor: Jeong-jin Park, Suwon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 15 days.

(21) Appl. No.: 13/968,649

(22) Filed: Aug. 16, 2013

(65) Prior Publication Data

US 2014/0104643 A1   Apr. 17, 2014

Related U.S. Application Data

(60) Provisional application No. 61/712,937, filed on Oct. 12, 2012.

(30) Foreign Application Priority Data

Jan. 24, 2013   (KR) .................. 10-2013-0008211

(51) Int. Cl.
   *G06F 3/12*   (2006.01)
(52) U.S. Cl.
   CPC .................. *G06F 3/1292* (2013.01)
(58) Field of Classification Search
   USPC ..................................... 358/1.15
   See application file for complete search history.

(56) References Cited

U.S. PATENT DOCUMENTS

| | | | |
|---|---|---|---|
| 8,248,637 B2 | 8/2012 | Dolan et al. | |
| 9,298,334 B1* | 3/2016 | Zimmerman | G06F 3/048 |
| 2004/0080778 A1* | 4/2004 | Ito et al. | 358/1.14 |
| 2005/0008221 A1* | 1/2005 | Hull | G06F 17/212 |
| | | | 382/161 |
| 2006/0039029 A1* | 2/2006 | Yagita | H04N 1/00222 |
| | | | 358/1.15 |
| 2006/0077428 A1 | 4/2006 | Lovat et al. | |
| 2009/0021790 A1 | 1/2009 | Krovitz et al. | |
| 2010/0245909 A1 | 9/2010 | Yamaguchi | |
| 2011/0075203 A1* | 3/2011 | Maekawa | G06F 3/1205 |
| | | | 358/1.15 |
| 2011/0109934 A1 | 5/2011 | Lee | |
| 2012/0026548 A1* | 2/2012 | Nakagawa | G06F 3/1203 |
| | | | 358/1.15 |

(Continued)

FOREIGN PATENT DOCUMENTS

JP   2006137084   6/2006

OTHER PUBLICATIONS

International Search Report dated Jan. 29, 2014 issued in International Application No. PCT/KR2013/008581.

*Primary Examiner* — Huo Long Chen
(74) *Attorney, Agent, or Firm* — Staas & Halsey LLP

(57) ABSTRACT

A method of printing at least one of contents shared between applications installed in an operating system (OS), and a computing apparatus to perform the method. According to the method, a printing application is executed by activating a companion window according to a share action requested to share the content being used in a source application, and a printing operation is performed through the activated companion window.

20 Claims, 13 Drawing Sheets

(56) References Cited

U.S. PATENT DOCUMENTS

| | | | |
|---|---|---|---|
| 2012/0159334 A1* | 6/2012 | Messerly et al. | 715/733 |
| 2012/0167004 A1* | 6/2012 | Gordner | G06F 8/33 |
| | | | 715/792 |
| 2012/0174031 A1* | 7/2012 | Dondurur et al. | 715/808 |
| 2012/0250072 A1* | 10/2012 | Miller | G06F 3/1205 |
| | | | 358/1.15 |
| 2013/0003098 A1* | 1/2013 | Hayakawa et al. | 358/1.13 |
| 2013/0169976 A1* | 7/2013 | Yamada | 358/1.2 |
| 2014/0068593 A1* | 3/2014 | McErlane | G06F 8/61 |
| | | | 717/171 |

\* cited by examiner

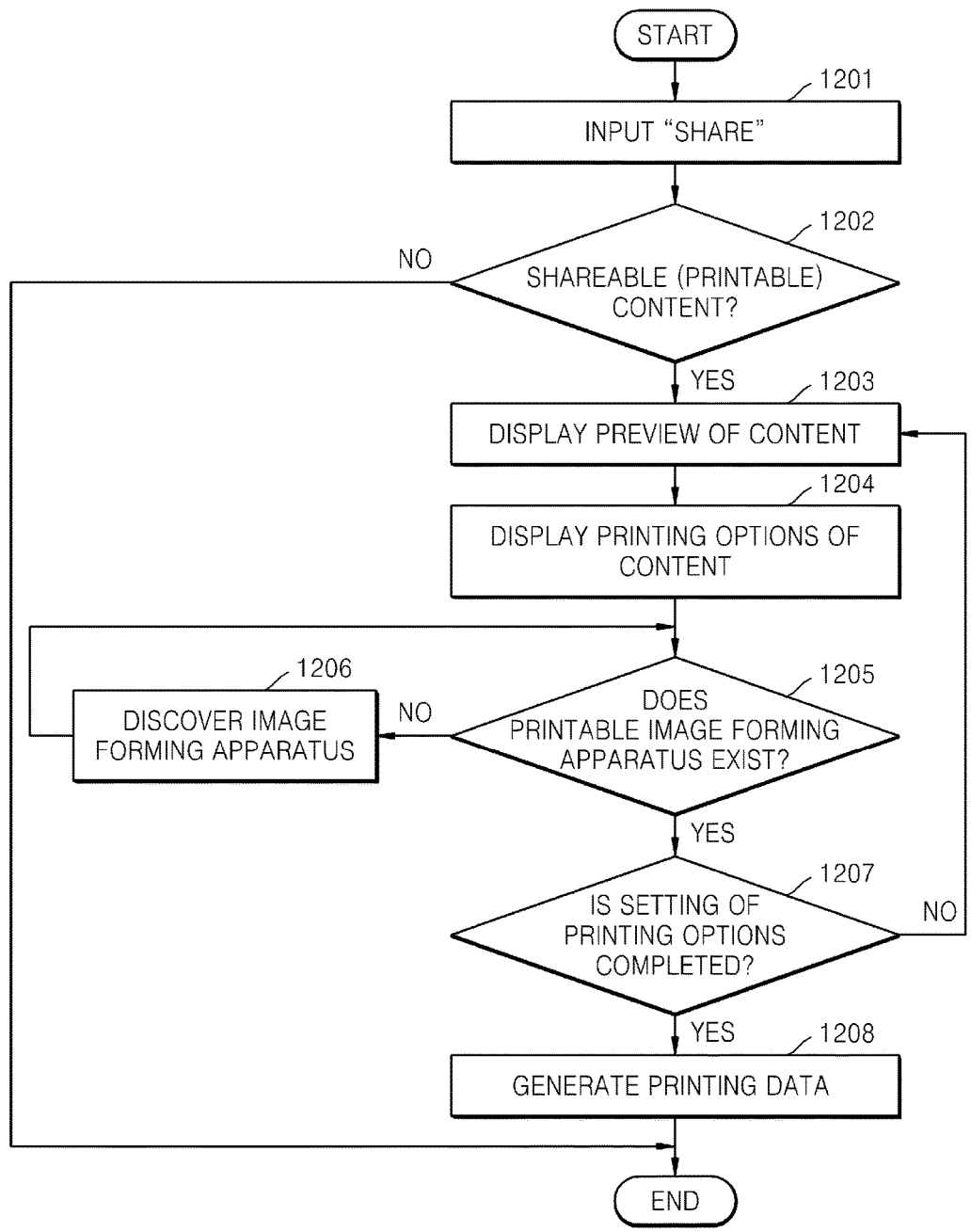

METHOD OF PRINTING CONTENT SHARED BETWEEN APPLICATIONS AND COMPUTING APPARATUS TO PERFORM THE METHOD

CROSS-REFERENCE TO RELATED APPLICATIONS

This application claims priority under 35 U.S.C. §§ 119 and 120 from U.S. Provisional Application No. 61/712,937, filed on Oct. 12, 2012, in the US Patent and Trademark Office, and Korean Patent Application No. 10-2013-0008211, filed on Jan. 24, 2013, in the Korean Intellectual Property Office, the disclosures of which are incorporated herein in their entireties by reference.

BACKGROUND OF THE INVENTION

1. Field of the Invention

The present general inventive concept relates to a method of printing content shared between applications installed in an operating system (OS) according to a shared action of users, a computing apparatus to perform the method, and a computer-readable medium to execute the method.

2. Description of the Related Art

Recently, the use of mobile computing apparatuses, such as smart phones and tablet devices, has considerably increased along with the use of traditional computing apparatuses, such as personal computers (PCs) and laptops. An operating system (OSs), such as MS-DOS, Windows OS, LINUX, Macintosh (MAC) OS, Android OS, or iOS, is installed on a computing apparatus.

A user may use contents of various types supported by the installed OS while using the computing apparatus. For example, the user may view an image, edit a document, watch a movie, or listen to music when using the computing apparatus. In some cases, the user may want to print out content that is being used. Thus, if the user requests the computing apparatus to print out the content that is being used, most OSs may generate a command to print out the content by using a printer driver pre-installed on the computing apparatus.

However, when a printer driver is not pre-installed or a printer driver is not compatible with a printer to be used, the computing apparatus is unable to perform the printing command. Specifically, since most mobile computing apparatuses, such as smart phones and tablet devices, are not installed with printer drivers used by PCs or laptops, the user has difficulties in printing the necessary content.

SUMMARY OF THE INVENTION

The present general inventive concept provides a method of printing content shared between applications, and a computing apparatus performing the method. The present general inventive concept also provides a computer-readable medium having recorded thereon a program to execute the method.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing a method of printing at least one content shared between applications installed in an operating system (OS), the method including activating a companion window to provide a printing application according to a share action requested to share content being used in a source application, executing the printing application in the activated companion window when the content is shared with the printing application, and generating printing data about the content by using the executed printing application when print setting on the content is completed through the activated companion window.

The foregoing and/or other features and utilities of the present general inventive concept may also be achieved by providing a computer-readable medium having recorded thereon a program to execute the method described above and/or hereinafter.

The foregoing and/or other features and utilities of the present general inventive concept may also be achieved by providing an apparatus at least one content shared between applications installed in an operating system (OS), the apparatus including a display unit to display a companion window providing a printing application according to a share action requesting to share content being used in a source application, and a processor to execute the printing application on the displayed companion window when the content is shared with the printing application, and when a print setting regarding the content is completed through the displayed companion window, generating printing data on the content by using the executed printing application.

The foregoing and/or other features and utilities of the present general inventive concept may also be achieved by providing an apparatus to print at least one content shared between applications, the apparatus including a processor to process one or more commands of an operating system (OS), a source application, and a printing application, and a storage unit to store the OS, the source application, and the printing application, wherein the source application uses the content via a user interface on a source window, the OS activates a companion window to provide the printing application according to a share action requesting to share the content being used in the source application, and the printing application is executed in the activated companion window according to the share action to generate printing data regarding the content when a print setting on the content is completed through the activated companion window.

The foregoing and/or other features and utilities of the present general inventive concept may also be achieved by providing an apparatus to print at least one content shared between applications, the apparatus including a display unit to display a source window of a source application and a companion window of a printing application, and a processor to control the display unit, wherein the display unit displays the companion window to provide the printing application when a share action is requested for the content being used in the source application, and the companion window comprises a user interface (UI) screen providing a preview of the content and printing options settable in the content when the printing application is executed in the companion window.

The foregoing and/or other features and utilities of the present general inventive concept may also be achieved by providing a computing apparatus configured to be connectable to an image forming apparatus, the computing apparatus including a display unit and a processor to simultaneously operate a source application and a target application associated with the image forming apparatus to generate a source window of the source application and a companion window of the target application such that the source window and the companion window are simultaneously displayed on the display unit to share a content between the source application and the target application.

The target application may include a printing application that is different from a printer driver application.

The companion window may include one or more icons including a share icon to perform a sharing operation of the content of the source window of the source application, and the target application may be performed upon selection of the share icon.

The companion window may include at least one of a side bar including a share icon, a first companion window including a print application, and a second companion window including at least one printing option.

When the content is modified in the source window, the modified content may be displayable in the companion window.

The computing apparatus may maintain operations of the source application and the target application.

The display unit may include a screen to simultaneously display a first image of the shared content in the source window and a second image of the shared content in the companion window on the screen.

The first image of the shared content may be different from the second image of the shared content in dimension.

The first image of the shared content may include a first menu to perform an operation of the source application on the shared content, and the second image of the shared content may include a second menu to perform an operation of the target application on the shared content.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 12 is a flowchart illustrating a method of printing at least one content shared between applications installed in an OS, according to an embodiment of the present general inventive concept.

DETAILED DESCRIPTION OF THE PREFERRED EMBODIMENTS

Figure 1:
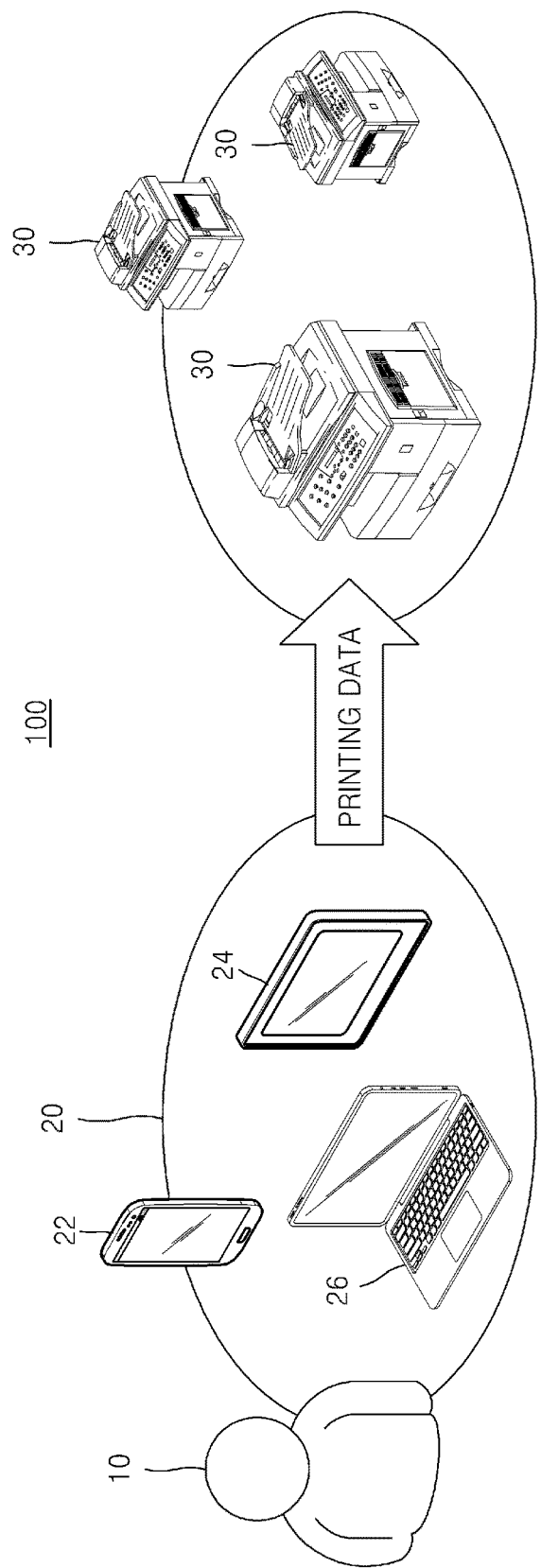
FIG. 1 is a diagram illustrating an image forming system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms first and second are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Hereinafter, one or more embodiments of the present general inventive concept will be described in detail with reference to accompanying drawings.

FIG. 1 is a diagram illustrating an image forming system 100 according to an embodiment of the present general inventive concept. Referring to FIG. 1, the image forming system 100 includes at least one computing apparatus 20 and at least one image forming apparatus 30.

The computing apparatus 20 in the current embodiment may be a generally well-known mobile or non-mobile device, such as a smart phone 22, a tablet device 24, a laptop computer 26, a mobile phone, a personal digital assistant (PDA), or a personal computer (PC), but is not limited thereto. Also, the computing apparatus 20 may be any one of various apparatuses capable of receiving a touch input, such as an electronic blackboard and a touch table.

Also, the image forming apparatus 30 may include a general multifunction peripheral (MFP) supporting at least one function, such as copying, faxing, printing, emailing, scanning, or data transmitting to a server. Hereinafter, for convenience of description, the image forming apparatus 30 is an MFP, but alternatively, the image forming apparatus 30 may be a separate apparatus having an image forming function, such as a printer, a scanner, or a facsimile.

In FIG. 1, the computing apparatus 20 may be the smart phone 22, the tablet device 24, or the laptop computer 26, but alternatively, the computing apparatus 20 may include at least one of the smart phone 22, the tablet device 24, and the laptop 26, or may include other devices. Also, the image forming system 100 of FIG. 1 may include at least one image forming apparatus 30.

The image forming apparatus 30 performs image forming functions, such as copying, faxing, printing, and emailing, by receiving printing data from the computing apparatus 20. Thus, the computing apparatus 20 first generates the printing data.

For example, a user 10 may want to print content (or contents) on a printing medium while using the content in an application installed in the tablet device 24. In this case, the user 10 may request the image forming apparatus 30 to print out the content being used by executing an application to perform a printing-related function installed in the tablet device 24. At this time, the tablet device 24 generates printing data of the content to be printed out. The same operations are applied and performed when the user 10 uses the computing apparatus 20, such as the smart phone 22 or the laptop computer 26.

Generally, when a printing operation is to be performed by a computer, such as a PC, content is printed out by generating printing data about the content by using a printer driver installed by a printer manufacturer and pre-installed on the PC. For example, when a Windows® operating system (OS) of MICROSOFT Corporation is installed on the PC and a user wants to print out content prepared in MS Word, a printing operation of the content has to be performed by using a printer driver pre-installed in the Windows® OS. Thus, if the printer driver is not pre-installed in the Windows® OS, the printing operation cannot be performed. The same applies to other devices that have to perform a printing operation by using a printer driver.

In a mobile device installed with an OS, for example, an Android OS that is an OS of a mobile device recently developed by GOOGLE, when a user executes a share function while using content, a printing function application is initiated or activated to perform a printing operation.

However, according to the share function supported by the Android OS, when the printing function application is executed as the user wants to share the content, an existing application being executed at that time is switched to an application operating in a background thereof. In this case, when system resources of the mobile device are insufficient, the operation operating in the background may not be continuously executed and may be immediately terminated. That is, the printing operation cannot be performed.

Moreover, since the printing function application that has a high load or requires a high memory space (and/or complicated processes) has to be executed whenever the content is to be shared, the user has to select or execute a previous application that was using the content again in order to use the previous application again. In other words, when the user wants to suddenly print out the content while viewing the content, the user has to separately execute the printing function application and perform several operations to print out the content.

However, according to the current embodiment, when the user 10 wants to print out content while viewing the content in an application, the content may be immediately printed out through the image forming apparatus 30 at any time even if a printer driver is not installed on the computing apparatus 20 or a printer driver is not used. Also, according to the current embodiment, the user 10 may simply and immediately perform the printing operation while viewing the content, while an application being used is not closed (that is, is not switched to the background), unlike the share function of the Android OS or similar functions of other OSs.

Specifically, a share function used in the computing apparatus 20 of the current embodiment, which will be described below, has a completely different definition from the share function of the Android OS or similar functions of other OSs. In other words, the term "share function" used in the computing apparatus 20 of the current embodiment is used only for convenience of description, and is different from the share function of the Android OS. In addition, the term "share function" may be changed to another term as long as the same functions and operations described in the current embodiment are performed.

Hereinafter, functions and operations of the computing apparatus 20 according to the current embodiment to print out content (or contents) shared between applications will be described in detail.

Figure 2A:
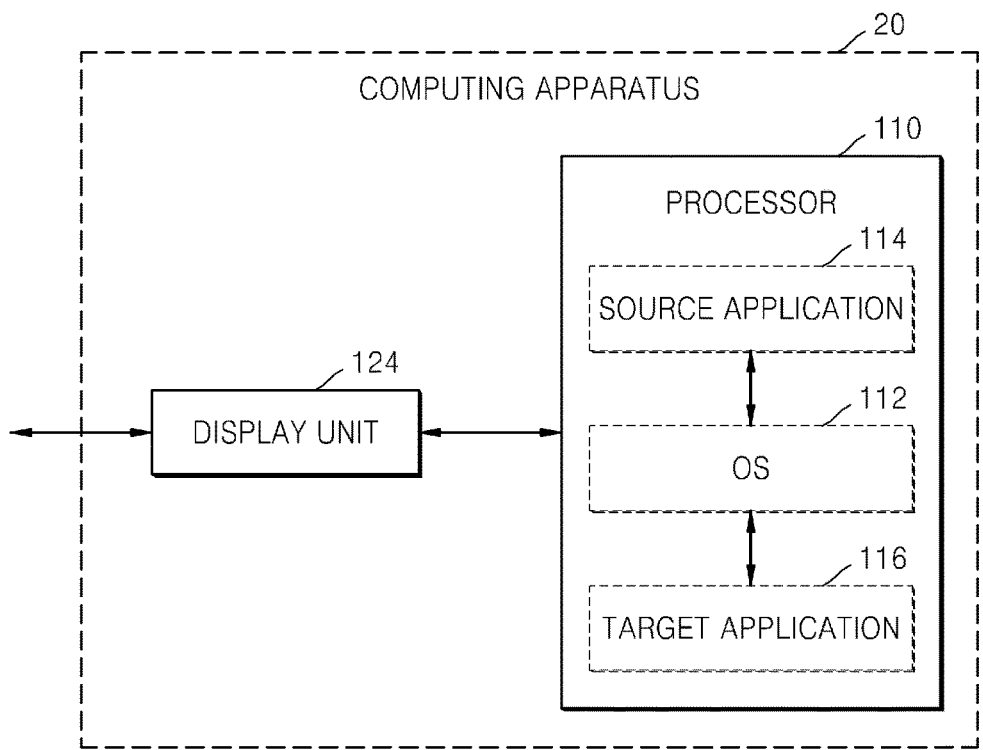
FIG. 2A is a block diagram illustrating a computing apparatus according to an embodiment of the present general inventive concept.

FIG. 2A is a block diagram illustrating the computing apparatus 20 according to an embodiment of the present general inventive concept.

Referring to FIG. 2A, the computing apparatus 20 includes a processor 110 and a display unit 124. The processor 110 may be a controlling unit to control operations of a source application 114, an OS 112, and a target application 116 by processing commands of the source application 114, the OS 112, and the target application 116. Also, the processor 110 may be a controlling unit for controlling overall operations of the computing apparatus 20.

FIG. 2A only illustrates hardware components related to the current embodiment. However, it is possible that other general-use hardware components in addition to the hardware components of FIG. 2A may be included in the computing apparatus 20.

Meanwhile, the processor 110 may be a central processing unit (CPU), an application processor (AP), or a graphic processor unit (GPU) which includes at least one processor. The processor 110 may be realized as an array of a plurality of logic gates or a combination of general-use microprocessors, but is not limited thereto. In other words, the processor 110 may be realized as any one of various hardware or software modules.

First, the source application 114, the target application 116, a companion application, and a companion window will be described in detail.

The source application 114 is a general application installed in the OS 112, and denotes an application that is generally known to the user 10 for using content, i.e., view or edit content, on the OS 112. The content corresponds to a sharing source, and an application that is currently using the content is the source application 114 in the current embodiment.

For example, the source application 114 may be Paint, Photo Viewer, MS Word, or MS Excel in Window OS, which are generally well-known applications, but the present invention is not limited thereto. In other words, the source application 114 may be a content-related application that is frequently used as the user 10 uses the smart phone 22, the tablet device 24, or the laptop computer 26.

The target application 116 is an application installed in the OS 112, which is capable of performing a share action requested by the user 10 upon receiving shareable content. Unlike the source application 114, the target application 116 is a companion application executable only in a companion window. In other words, in order to classify the target application 116 and the source application 114 in the current embodiment, an application that is only executed in a companion window and is targeted to share content is the target application 116.

The companion window will be described in detail later. Shortly, the companion window denotes a user interface (UI) screen that is displayed next to a source window or by partially overlapping the source window, as illustrated in FIGS. 6 through 9.

Also, the companion application denotes an application only executable in the companion window, unlike the source application 114, and has the same or similar meaning as the target application 116. The companion application is an application that may be installed with a main application (the source application 114) to the OS 112, or separately from the main application (the source application 114) to the OS 112. In other words, the companion application may be an application only for performing a share action requested while the source application 114 is using the content.

The printing application according to the current embodiment is a companion application executed in the companion window activated by the share action, while the source window of the source application 114 is retained on the display unit 124. In other words, the printing application according to the current embodiment may be a type of the target application 116 or the companion application.

Accordingly, the printing application may be an application performing a printing operation like a generally known printer driver application, but the printing application is performed in a companion window environment and the printer driver application is performed on a source window environment. Also, the printing application is a companion application and the printer driver application is a source application. Moreover, processes of generating printing data are different.

Meanwhile, the share function defined in the current embodiment may correspond to a share function installed in Windows 8®, or an application of a share function in Windows 8®. Also, the share function may correspond to a function having a different term in another OS, which is correspond to the share function installed in Windows 8®, or in a version of Windows to be released after Windows 8®.

For example, the source application 114 and the target application 116 of the current embodiment may correspond to applications in Windows 8®, a version of Windows to be released after Windows 8®, or another OS having a similar function as the share function installed in Windows 8®.

In other words, the OS 112 of the current embodiment may be Windows 8®, a version of Windows to be released after Windows 8®, or another OS having a similar function as the share function installed in Windows 8®.

Also, the companion window may correspond to the Share charm installed in Windows 8®, and the companion application may be an application executed in the Share charm.

The current embodiment is described with respect to Windows 8®, but is not limited thereto, and any OS supporting a share function between applications, which will be described below, may be the OS 112 of the current embodiment. Also, even though the current embodiment is described with reference to Windows 8®, only functions and operations of the current embodiment, which are developed from or different from basic functions and operations of Windows 8®, are described.

Meanwhile, since "share" in Windows 8® and "share" in an Android operating system are different from each other, the difference thereof will not be described herein.

Referring to FIG. 2A, the display unit 124 displays the companion window providing the printing application (the target application 116) according the share action requested to share content being used in the source application 114.

When the content is shared with the printing application, the processor 110 executes the printing application in the displayed companion window. Then, when a printing setting on the content is completed through the displayed companion window, the processor 110 generates the printing data for the content by using the executed printing application.

Figure 2B:
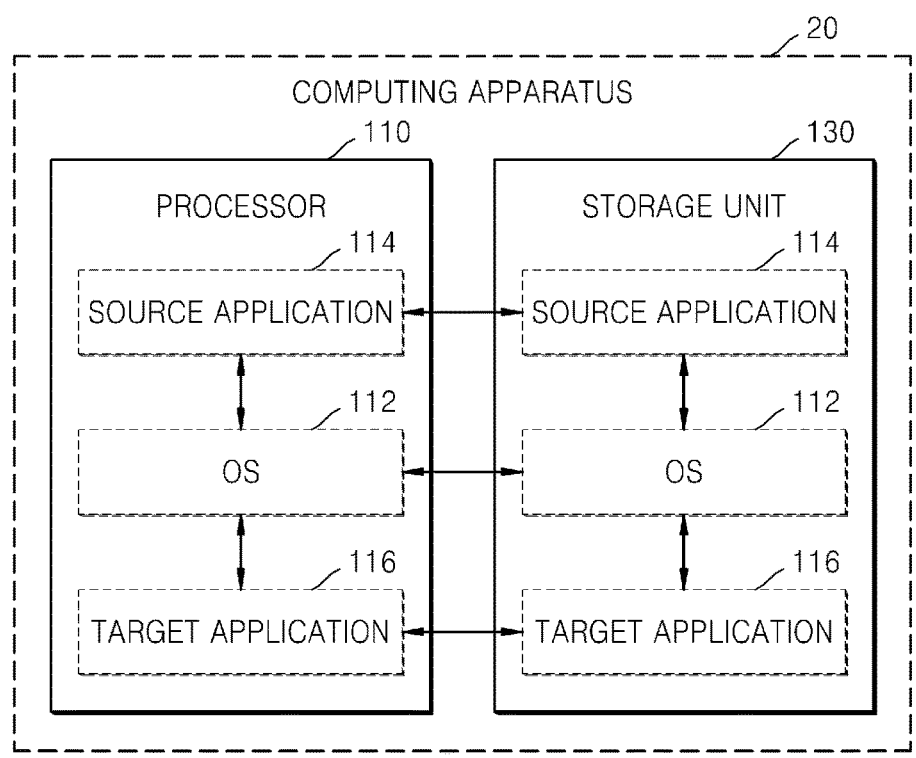
FIG. 2B is a block diagram illustrating a computing apparatus according to an embodiment of the present general inventive concept.

FIG. 2B is a block diagram illustrating the computing apparatus 20 according to another embodiment of the present general inventive concept.

Referring to FIG. 2B, the computing apparatus 20 includes the processor 110 and a storage unit 130. FIG. 2B only illustrates hardware components related to the current embodiment. However, the computing apparatus 20 may include other general-use hardware components as well as the hardware components of FIG. 2B.

Meanwhile, the processor 110 may be a central processing unit (CPU), an application processor (AP), or a graphic processing unit (GPU) including at least one processor. The processor 110 may be realized as an array of a plurality of logic gates or a combination of general-use microprocessors, but is not limited thereto. In other words, the processor 110 may be realized as any one of various hardware or software modules.

Referring to FIG. 2B, the storage unit 130 may be a storage medium, such as nonvolatile memory or a hard disk driver (HDD), and stores the source application 114, the OS 112, and the target application 116.

The processor 110 may be a controlling unit to control operations of the source application 114, the OS 112, and the target application 116 by processing commands (including data) related to operations described below of the source application 114, the OS 12, and the target application 116. The processor 110 may read and process the source application 114, source codes of the OS 112, and the target application 116 stored in the storage unit 130. Meanwhile, the processor 110 may be to a controlling unit to control overall operations of the computing apparatus 20.

The source application 114 is an application for using content via an interface with the user 10.

The OS 112 activates the companion window providing the printing application (the target application 116) according to the share action requested to share the content being used in the source application 114.

The printing application is executed in the companion window activated according to the share action. The printing application generates the printing data for the content when the print setting on the content is completed through the activated companion window.

Figure 3:
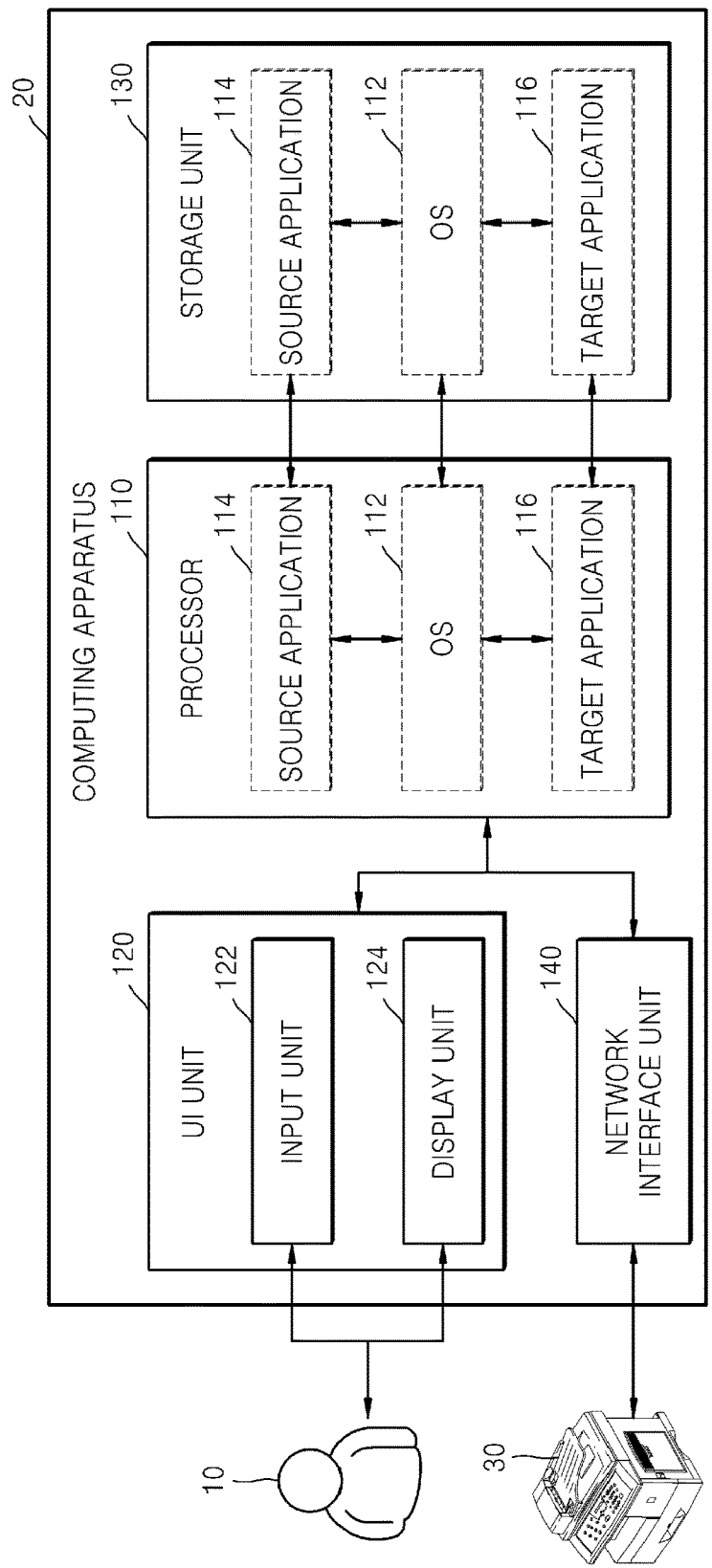
FIG. 3 is a block diagram illustrating a computing apparatus according to an embodiment of the present general inventive concept.

FIG. 3 is a block diagram showing in detail the computing apparatus 20 according to an embodiment of the present general inventive concept.

Referring to FIG. 3, the computing apparatus 20 includes the processor 110, a user interface (UI) unit 120, the storage unit 130, and a network interface unit 140. The UI unit 120 includes an input unit 122 and the display unit 124. The same components of the computing apparatus 20 of FIG. 3 and components of the computing apparatus 20 of FIG. 2A or 2B are denoted by the same reference numerals.

Meanwhile, FIG. 3 only illustrates hardware components related to the current embodiment in order. However, it is possible that the computing apparatus 20 may include other general-use hardware components as well as the hardware components illustrated in FIG. 3.

Meanwhile, the processor 110 may be to a CPU, an AP, or a GPU including at least one processor. The processor 110 may be realized as an array of a plurality of logic gates or a combination of general-use microprocessors, but is not limited thereto. In other words, it would be obvious to one of ordinary skill in the art that the processor 110 may be realized as any one of well-known various hardware or software modules.

Referring to FIG. 3, the storage unit 130 may be any kind of storage media, such as volatile memory, nonvolatile memory, or an HDD, in the computing apparatus 20. In particular, the nonvolatile memory or the HDD in the storage unit 130 stores the source application 114, the OS 112, and the target application 116.

The processor 110 may be a controlling unit to control operations of the source application 114, the OS 112, and the target application 116 by processing commands related to operations described below of the source application 114, the OS 112, and the target application 116. The processor 110 may read and process the source application 114, source codes of the OS 112, and the target application 116 stored in the storage unit 130. Meanwhile, the processor 110 may be a controlling unit controlling overall operations of the computing apparatus 20.

The input unit 122 receives information input by the user 10 through the computing apparatus 20. An input of the user 10 may be at least one of a touch-based input, a motion-based input, a vision-based input, a keyboard-based input, or a mouse-based input, but is not limited thereto. In other words, the input unit 122 may be realized as at least one of an electrostatic touch panel, a resistive touch panel, a keyboard, a mouse, or a motion recognition camera, but is not limited thereto.

For example, a touch-based input may be in accordance with a touch-based gesture of the user 10. Examples of the touch-based gesture of the user 10 include tap (or touch), long tap (or long touch), touch and hold, touch and drag, double tap, drag, panning, flick, drag and drop, and sweep, but are not limited thereto. A motion-based input may be according to a motion-based gesture of the user 10 with regard to the computing apparatus 20, for example, shaking the computing apparatus 20 or hitting the computing apparatus 20 in a virtual space. A vision-based input may be according to a gesture of the user 10 recognized by analyzing an input image obtained by using a camera, without the user 10 contacting the computing apparatus 20.

The display unit 124 may be a display panel, such as a liquid crystal display (LCD) or a light-emitting display (LED), but is not limited thereto as long as information processed in the computing apparatus 20 is installed to the user 10.

When the computing apparatus 20 is the smart phone 22 or the tablet device 24, the UI unit 120 may be a touch screen, and when the computing apparatus 20 is a laptop 26 or a PC, the UI unit 120 may be a monitor, a keyboard, or a mouse.

The network interface unit 140 transmits and received data to and from the image forming apparatus 30 in wireless or wired manner. The network interface unit 140 may include a wired local area network (LAN) card, such as Ethernet, a wireless LAN card capable of communicating with an access point (AP) via Wi-Fi, a Wi-Fi direct module, or a Bluetooth module, but is not limited thereto.

Operations and functions of components of the computing apparatus 20 according to the current embodiment will now be described in detail.

The computing apparatus 20 according to the current embodiment has a function capable of printing content shared between applications provide in the OS 112, by generating and transmitting printing data of the content to the image forming apparatus 30. The applications may be the source and target applications 114 and 116 described above, and specifically in the current embodiment, the target application 116 is the printing application performing a printing function of the content.

The content according to the current embodiment includes a text, an image, a video, a link, a hypertext mark-up language (HTML), or a binary file, and is an object used by the user 10 in the computing apparatus 20. Specifically, the content according to the current embodiment is not limited to a multipurpose internal mail extension (MIME) type.

The user 10 uses the content via an interface through the source window of the source application 114 displayed on the UI unit 120. The source window may denote a UI screen to perform an operation of the source application 114.

The user 10 may want to share the content by using another application while the content is being used in the source application 114. For example, the user 10 may want to print out image content being viewed through a Photo Viewer application of Windows 8® by sharing the image content with the printing application (the target application 116).

The processor 110 controls an operation of the OS 112 to activate the companion window to provide the printing application, according to the share action requested to share the content being used in the source application 114 with another application. In this case, the display unit 124 displays the companion window where the printing application is installed on a screen.

As will be described in detail later, the companion window is a UI screen that is next to the source window or partially overlaps the source window as illustrated in FIGS. 6 through 9, and may be simultaneously displayed with the source window. It is also possible that the companion window and the source window may be superimposed. Thus, the source application 114 and the printing application may be simultaneously operated on one screen of the display unit 124. Such a feature is different from the case where a printing operation is performed by using a conventional printer driver, or a shared function of an Android OS.

The companion window includes a first companion window providing a list of target applications 116 or shortcuts corresponding to sharing end points where content is shareable, and a second companion window performing an operation on a sharing end point selected by the user 10 from the list. The sharing end points are destinations to be shared, and denote applications for performing certain operations. For example, the sharing end points may be a printing application, a social networking service (SNS) application, and a mail application, but are not limited thereto.

However, the companion window is divided into the first and second companion windows for convenience of description, and the companion window according to the current embodiment may be realized in any form as long as operations and functions of the companion window are performed. The sharing end point is a destination for sharing the content of the source application 114, and includes the printing application in the current embodiment.

As described above, the printing application according to the current embodiment is a type of the companion application, and denotes an application only executable in the companion window, unlike the source application 114. In other words, the printing application may be executed in the companion window activated by the share action, while the source window of the source application 114 is retained on the display unit 124.

The companion application may be installed together with a main application (the source application 114) to the OS 112, or individually from the main application (the source application 114) to the OS 112. In other words, the companion application may be an application to perform only the share action requested while the content is being used in the source application 114.

Also, as described above, the companion window may be usable as the Share charm installed by Windows 8®, and the companion application may be an application executable on the Share charm.

The share action according to the current embodiment is one of various system actions supported by the OS 112, and the OS 112 may also support a Favorite action or a Search action. Specifically, according to the current embodiment, the system actions supported by the OS 112 may narrowly denote actions performable in the companion window, but alternatively, may widely denote all system operations supported by the OS 112.

In order for the companion window to be activated according to the share action in the processor 110 or to be displayed according to the share action in the display unit 124, a predetermined input of the user 10 is required to request (invoke, initiate, or activate) the share action.

In detail, when the user 10 wants to share the content with the printing application while the source application 114 is using the content, the user 10 has to input a predetermined operation or gesture to request the share action of the OS 12 through the input unit 122.

For example, when the user 10 moves a mouse cursor to one corner or touches the mouse cursor via a certain gesture while the source application 114 is using the content, the processor 110 may determine that such movement of the mouse cursor or gesture is requesting or invoking the share action. The predetermined operation or gesture may be pre-set in the OS 112 or set by the user 10. In the current embodiment, an example of a cursor not only includes the mouse cursor that is movable by using a mouse, but also includes a cursor movable on a screen via a touch of the user or any other method.

Meanwhile, in order for the content to be shared with the printing application, a type of content shareable between the source and target applications 114 and 116 needs to be pre-registered.

Figure 4:
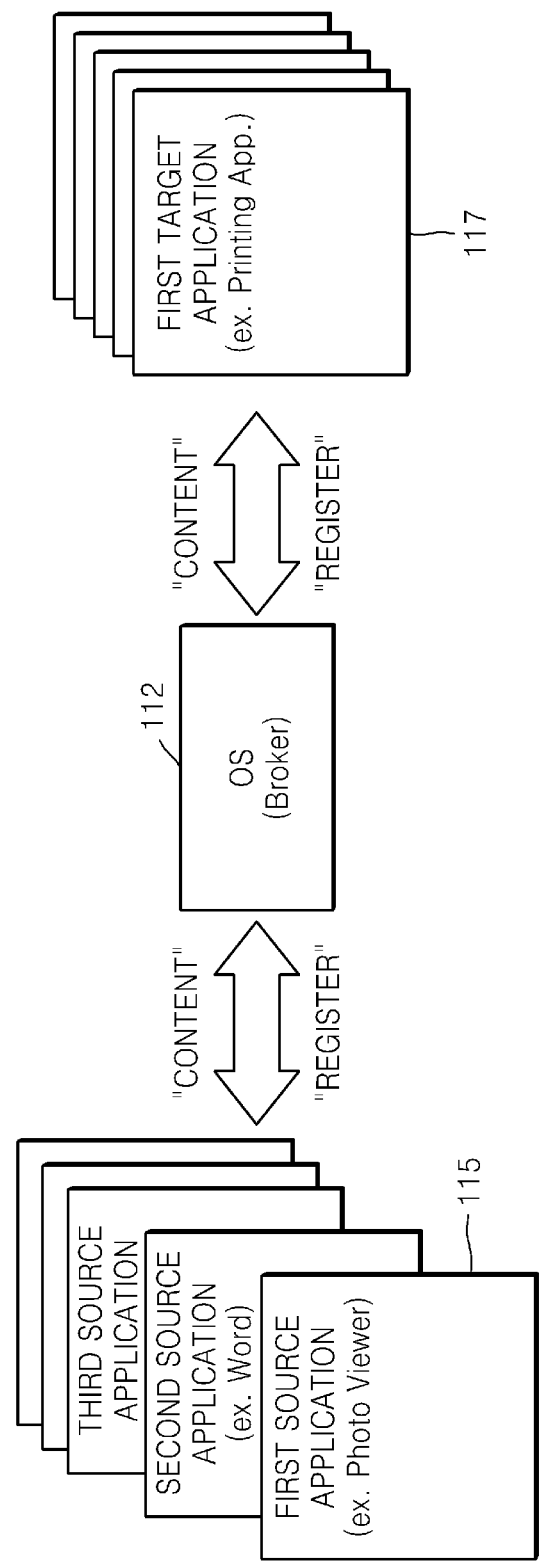
FIG. 4 is a diagram illustrating operations between an operating system (OS) and one of a source application and a target application, according to an embodiment of the present general inventive concept.

FIG. 4 is a diagram illustrating operations between an OS 112 and each of a source application and a target application, according to an embodiment of the present general inventive concept.

Referring to FIG. 4, various source applications, such as a first source application 115 (for example, Photo Viewer), a second source application (for example, MS Word), and a third source application, and various target applications, such as a first target application 117 (for example, Printing Application, a second target application, and a third target application are installed on the OS 112.

In FIG. 4 and other drawings, the first source application 115 corresponds to Photo Viewer and the first target application 117 corresponds to Printing Application, but the current embodiment is not limited thereto. Also, in the descriptions of other drawings, examples of a source application and target application are only for convenience of description, and the current embodiment may also be applied to other types of applications.

The OS 112 receives data about content prepared by the various source applications, such as the first source application 115, the second source application, and the third source application, and transmits the received data to the various target applications, such as the first target application 117, the second target application, and the third target application. The data about the content may have a DataPackage format, wherein a DataPackage is a basic unit of data exchange through a share contract introduced in Windows 8®. However, alternatively, the OS 112 may use another data format.

In other words, when an event of the share action is generated, the OS 112 operates as a broker performing brokerage of the data about the content between the source applications (the first source application 115) and the target applications (the first target application 117). According to the brokerage of the OS 112, the source applications and the target applications may not need to recognize each other's existence.

In order to share the content between applications supported by the OS 112, types of contents shareable between the applications need to be pre-registered in the OS 112.

In other words, the first source application 115 registers types of shareable contents, for example, image formats (JPG, GIF, TIFF, etc.) in the OS 112. Also, the first target application 117 registers types of shareable contents, for example, image formats (JPG, GIF, TIFF, etc.) and document formats (DOC, PDF, TXT, etc.) in the OS 112.

As such, when the registering of the types of contents shareable with the applications is completed, the OS 112 may map and manage the registered types as a sharable content.

In detail, when an input of a share action requesting sharing of an image content is received from the user 10 while the first source application 115 is being used, the processor 110 of FIG. 3 controls the OS 112 to determine whether types of shareable contents registered in each of the first source application 115 and the first target application 117 are types of contents that are mapped with each other.

The processor 110 may first determine a type of content to be shared with the first source application 115 by using manifest information. For example, when the type of the content is in a binary form, the processor 110 may determine the type by extracting a header of a content file thereof.

If the content is determined to be content shareable with the first target application 117, the processor 110 activates the companion window by including the first target application 117 into a list of target applications to be included in the companion window.

Referring back to FIG. 3, when the content is shared with the printing application, the processor 110 executes the printing application on the activated (displayed) companion window.

When the printing application is executed, the display unit 124 displays the UI screen providing a preview of the content or one or more printing options settable in the content on the activated companion window. Since types of printing options settable in the content are well known, details thereof are not described herein.

Alternatively, when the printing application is executed, the display unit 124 may display the UI screen providing a list of image forming apparatuses 30 capable of printing the content, as one of the printing options, on the activated companion window. In other words, the display unit 124 may display the list of image forming apparatuses 30 currently connectable on the activated companion window, or if there is no image forming apparatus 30 currently connectable, display a menu to discover another image forming apparatus.

Moreover, the display unit 124 may display the UI screen to provide the printing options settable in the content, differently according to the types of contents.

For example, when the type of content is an image, the display unit 124 may display the UI screen including printing options to rotate or crop the image. Alternatively, when the content is a document, the display unit 124 may display the UI screen including printing options to turn (or flip) pages of the document. In other words, the display unit 124 may display the UI screen to provide different printing options according to the types of contents on the activated companion window.

The input unit 122 receives settings of the printing options on the content from the user 10. The user 10 may check the preview of the content and/or the printing options displayed on the companion window through the display unit 124, and set the printing options. Once the user 10 set the printing options through the input unit 122, the display unit 124 may display an updated preview based on the set printing options on the UI screen.

Once the setting of the printing setting is completed through the activated companion window, the processor 110 generates the printing data on the content by using the executed printing application.

Figure 10:
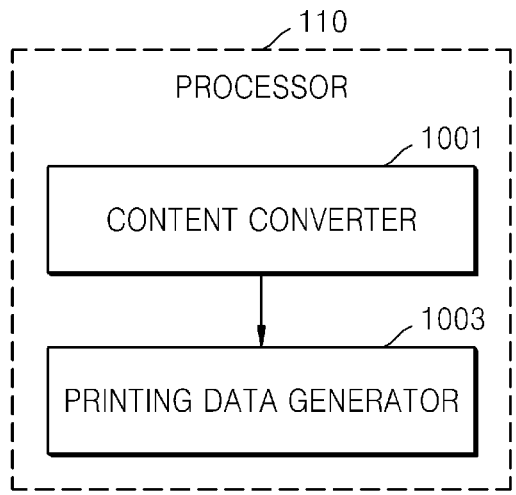
FIG. 10 is a block diagram illustrating a processor of a computing apparatus according to an embodiment of the present general inventive concept.

FIG. 10 is a block diagram illustrating the processor 110 of FIG. 2A, 2B, or 3 according to an embodiment of the present general inventive concept. Referring to FIG. 10, the processor 110 includes a content converter 1001 and a printing data generator 1003.

When the setting of the print setting is completed through the activated companion window, the content converter 1001 and the printing data generator 1003 may be driven by the printing application so as to generate the printing data.

The content converter 1001 renders the content into a printable format by using a component object model (COM) based on the completed print setting.

The COM is a communication protocol between objects published by MICROSOFT Corporation, and may denote a model for building a standardized data interface between the source application 114 of FIG. 3 and the printing application (the target application 116).

In other words, the content converter 1001 renders the content such that the data about the content used in the source application 114 is immediately recognized by the printing application (the target application 116) according to the COM. Since details about the COM are well known, descriptions thereof are omitted herein.

When a document converting object linking and embedding (OLE) (for example, MS Office) is installed in the computing apparatus 20, the content converter 1001 may render the content by using a dynamic linking library (DLL) of the document converting OLE. Alternatively, when the document converting OLE is not installed, the content converter 1001 may use a document converting program stored therein.

Based on a rendering result, the printing data generator 1003 generates the printing data in a format transmittable to the image forming apparatus 30.

As described above, the printing application is a companion application and is similar to the printer driver application (the source application 114) in that both generate the printing data, but the printing application and the printer driver application generate the printing data via different processes. Comparing the printing application according to the current embodiment and the printer driver application, the printing application has a low memory load since relatively low processing capacity is required, whereas the printer driver application has a high memory load since relatively high processing capacity is required.

In other words, the processor 110 may generate the printing data by using the executed printing application, without having to drive the printer driver application.

Referring back to FIG. 3, the network interface unit 140 transmits the printing data generated by the processor 110 to the image forming apparatus 30 in the image forming system 100 of FIG. 1.

The image forming apparatus 30 uses the received printing data to perform the printing operation requested by the user 10, for example, printing, copying, or emailing.

When the transmitting of the printing data is completed, the processor 110 deactivates the activated companion window. Then, the processor 110 terminates the executed printing application.

Accordingly, the sharing of the content between the source application 114 and the printing application (the target application 116) is completed.

During such a sharing process between applications, the source window of the source application 114 is continuously activated (displayed), and the user 10 may use at any time the source window as an interface regardless of displaying of the companion window. In other words, the user 10 may continuously use the content in the source application 114 through the source window even when the companion window is displayed.

Figure 5:
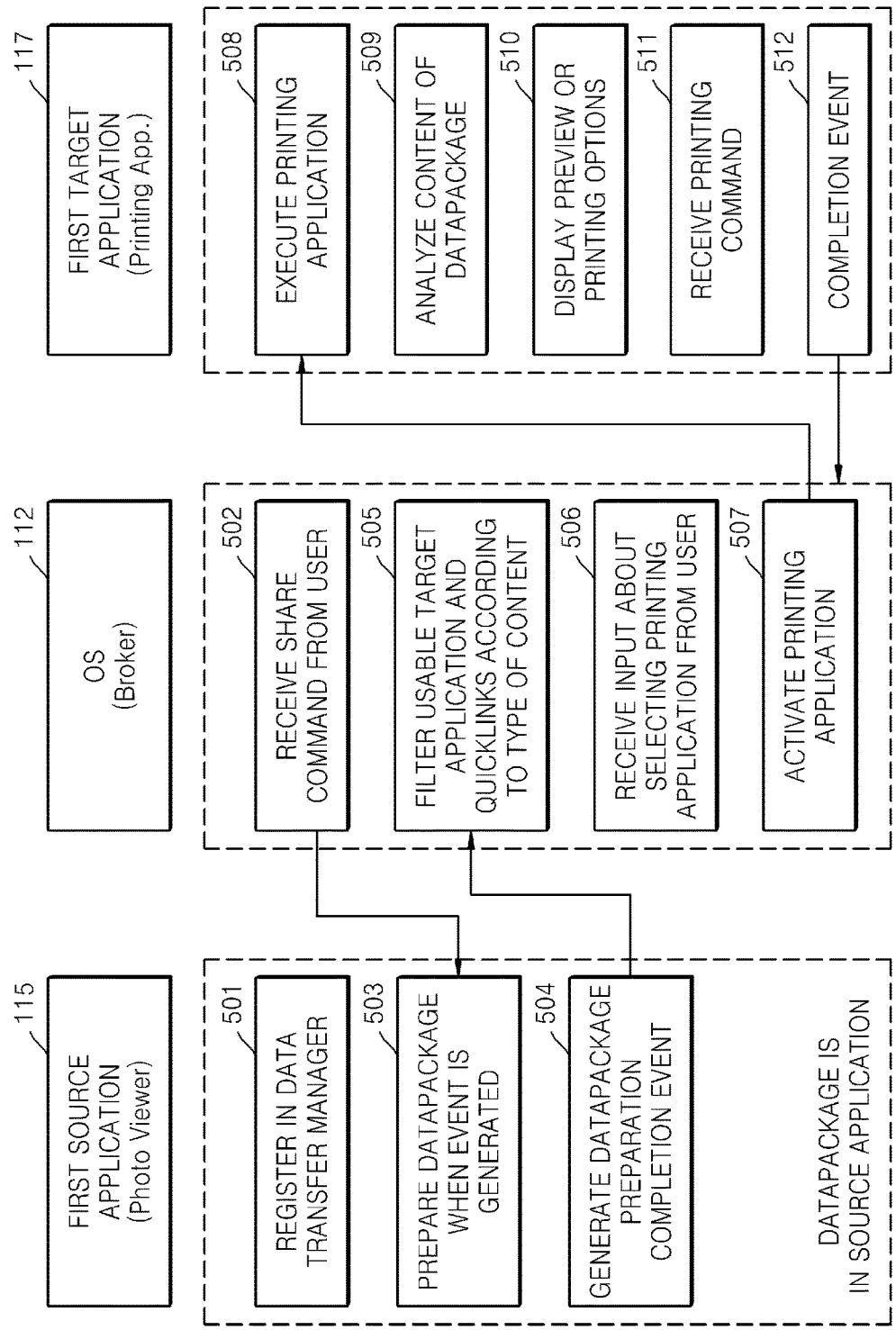
FIG. 5 is a diagram illustrating processes of printing at least one content shared between a first source application and a first target application according to a brokerage operation of an OS, according to an embodiment of the present general inventive concept.

FIG. 5 is a diagram illustrating processes of printing the content shared between the first source application 115 and the first target application 117, according to a brokerage operation of the OS 112, according to an embodiment of the present general inventive concept. The processes described with reference to FIG. 5 include operations performed by the computing apparatus 20 of FIGS. 2A, 2B, and 3. Accordingly, the same details described with reference to FIGS. 2A, 2B, and 3 may also be included in the description of FIG. 5, even though they are not specifically described again.

Referring to FIG. 5, the OS 112, the first source application 115, and the first target application 116 may operate according to a control of the processor 110.

In operation 501, the first source application 115 registers a type of shareable content in the OS 112. For example, the first source application 115 may register a type of shareable content in a Data Transfer Manager of the Windows® OS.

Although not illustrated in FIG. 5, the first target application 117 may also register a type of shareable content in the OS 112 in a similar manner.

In operation 502, the input unit 122 receives an input (a share command) to request (invoke) a share action from the user 10 while the content is being used in the first source application 115.

In operation 503, when an event of the share action is generated, the first source application 115 generates data to share the content. The first source application 115 may prepare data about the content in DataPackage format of the Windows® OS.

In operation 504, the first source application 115 notifies the OS 112 that the generating of the data for sharing the content is completed.

In operation 505, the processor 110 controls the OS 112 to determine target applications mapped to the type of content to be shared. The processor 110 may perform a filtering operation so that the first target application 117 corresponds to a shareable target application.

Then, the display unit 124 displays the companion window by providing the first target application 117 in the companion window.

In operation 506, the input unit 122 receives an input about selecting the first target application 117 from the user 10.

In operation 507, the processor 110 controls the OS 112 such that the first target application 117 is activated (executed) in the companion window.

In operation 508, the first target application 117 is executed in the companion window as described above.

In operation 509, the first target application 117 analyzes the data about the content transmitted according to brokerage of the OS 112.

In operation 510, the display unit 124 displays in the companion window the UI screen providing the preview of the content of the printing options settable in the content.

In operation 511, the input unit 122 receives the settings of the printing options and a printing command from the user 10.

In operation 512, the first target application 117 transmits a print completion event to the OS 112.

Figure 6:
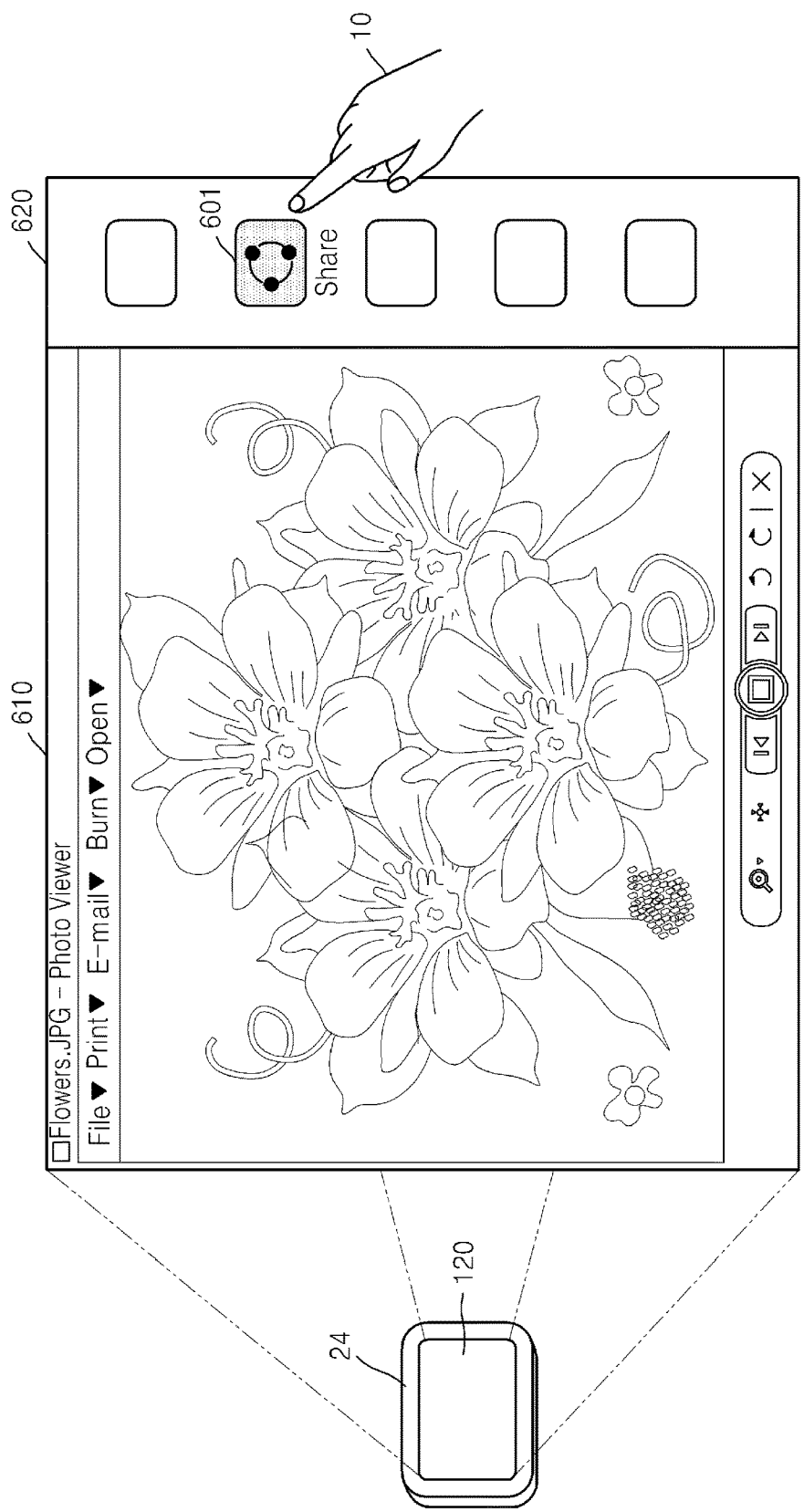
FIG. 6 is a diagram illustrating a source window and a side bar displayed on a user interface (UI) unit of a tablet device, according to an embodiment of the present general inventive concept.

FIG. 6 is a diagram illustrating a source window 610 and a side bar 620 displayed on the UI unit 120 of the tablet device 24 of FIG. 1, according to an embodiment of the present general inventive concept. However, a layout of the UI unit 120 in FIG. 6 is only an example for convenience of description, and is not limited thereto.

Referring to FIG. 6, the user 10 may execute a source application (Photo Viewer) in the tablet device 24, and view at least one of image contents through the source window 610 of the source application.

In this case, if the user 10 inputs a certain gesture on the tablet device 24, the side bar 620 is displayed (activated). In FIG. 6, the certain gesture is illustrated as an example since the tablet device 24 is used. When the computing apparatus 20 is the laptop computer 26, the side bar 620 may be displayed (activated) as a mouse cursor moves to a certain location. In other words, a method of displaying (activating) the side bar 620 may differ according to a type of the computing apparatus 20, and is not limited to only one type of the apparatus 20.

System actions supported by the OS 112 of the tablet device 24 may be displayed on the side bar 620. According to the current embodiment, a share icon 601 about a share action may be displayed.

In other words, when the user 10 wants to share at least one image content viewed through the source window 610 with the printing application, the user 10 first activates the side bar 620 including the share icon 601.

Meanwhile, the side bar 620 may be displayed at any location of a screen of the display unit 124, for example, top, bottom, left, and right of the screen, and is not limited to FIG. 6. Also, the side bar 620 may correspond to a Charm menu of Windows 8®.

Figure 7A:
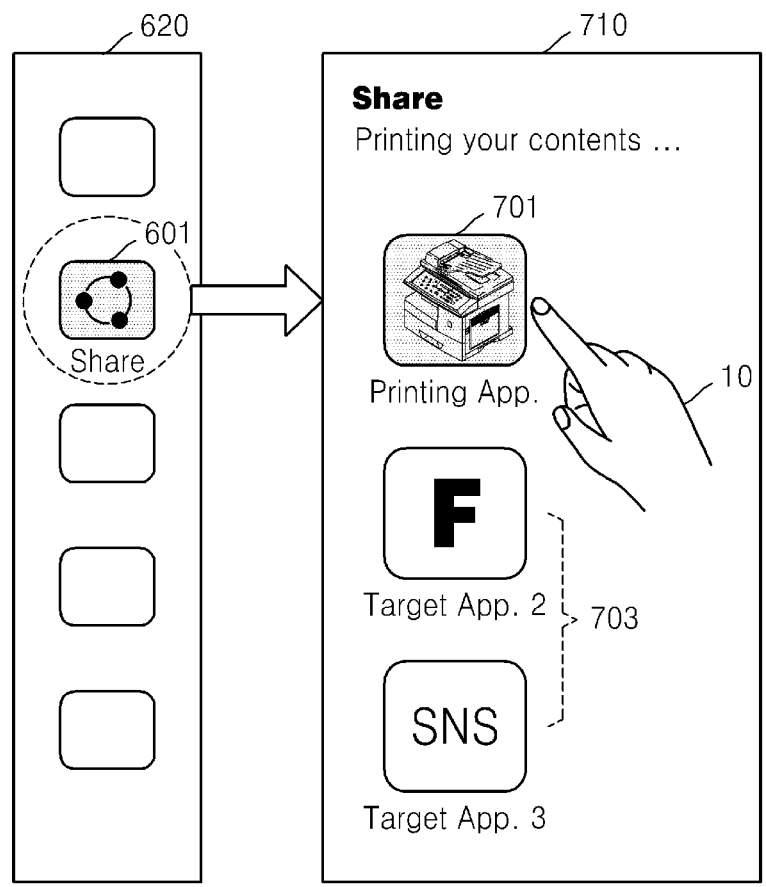
FIG. 7A is a diagram illustrating a side bar and a first companion window displayed on a UI unit of a tablet device, according to an embodiment of the present general inventive concept.

FIG. 7A is a diagram illustrating the side bar 620 and a first companion window 710 displayed on the UI unit 120 of the tablet device 24, according to an embodiment of the present general inventive concept. However, a layout of the UI unit 120 in FIG. 7A is only an example for convenience of description, and is not limited thereto.

Meanwhile, when the share icon 601 is selected in the side bar 620, the side bar 620 may be closed and only the first companion window 710 may be displayed. Alternatively, the side bar 620 and the first companion window 710 may be simultaneously displayed in a stepped form. In other words, a layout of the side bar 620 and the first companion window 710 is not limited.

In FIG. 6, the side bar 620 may be activated when the user 10 inputs a certain gesture to share image content being viewed through the source window 610 with the printing application.

The input unit 122 receives an input regarding the selecting of the share icon 601 from the user 10.

When the share icon 601 is selected in the side bar 620, the processor 110 activates the first companion window 710 to provide a list of target applications capable of sharing content being used by the source application. Then, the display unit 124 displays the first companion window 710.

Referring to FIG. 7A, the first companion window 710 displays a printing application 701, and second and third target applications 703 as the list of target applications capable of sharing the content being used in the source application. Accordingly, the first companion window 710 may be referred to as a target picker. The printing application 701 and the second and third target applications 703 correspond to sharing end points to share the content of the source application. The end points may be referred to the content used by the source application at a time when the target application is selected, and thus the end point of the content can be useable and sharable in both the source application and the target application.

The user 10 may select the printing application 701 displayed on the first companion window 710 through the input unit 122.

Figure 7B:
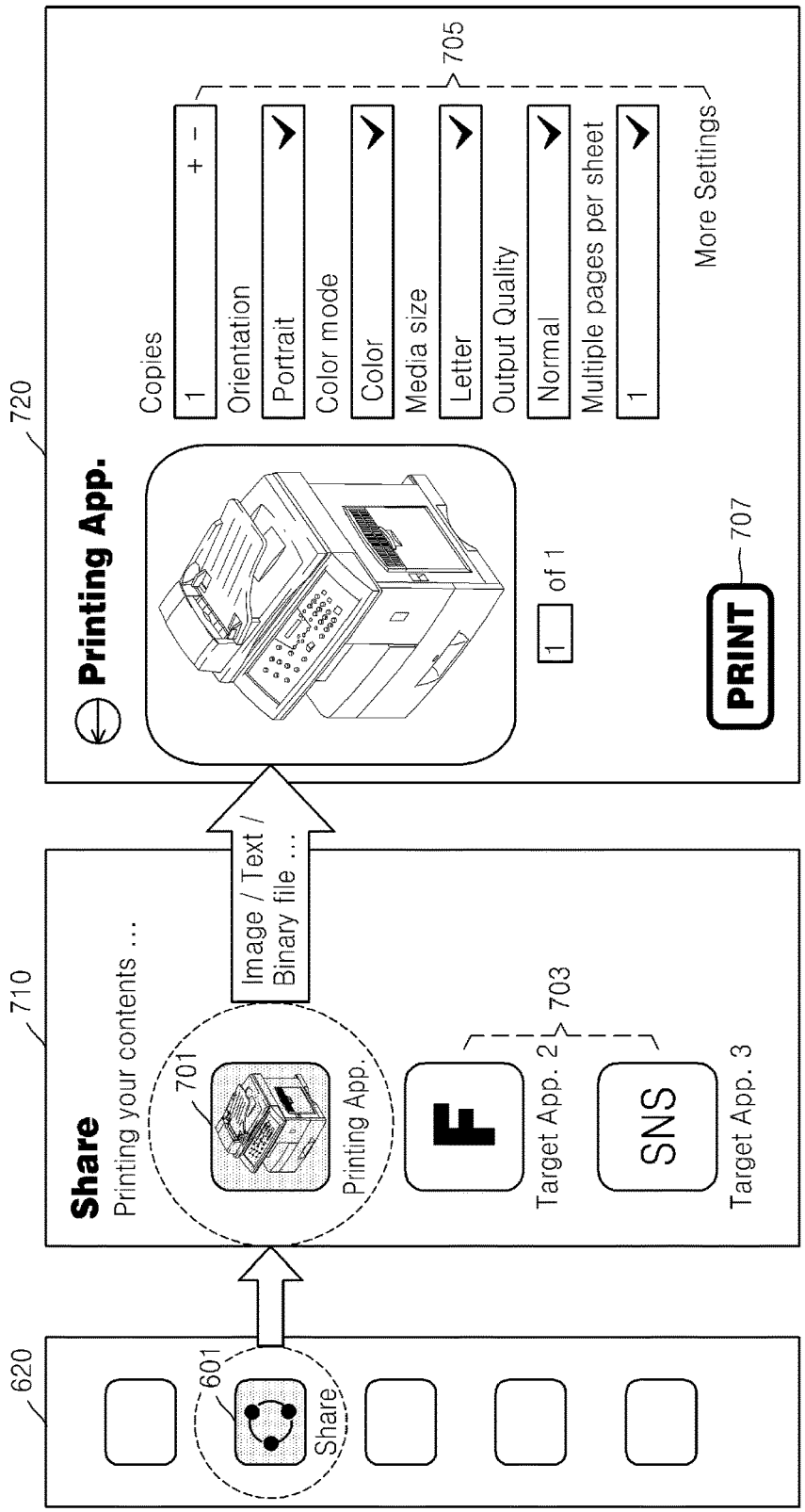
FIG. 7B is a diagram of a side bar, a first companion window, and a second companion window displayed on a UI unit of a tablet device, according to an embodiment of the present general inventive concept.

FIG. 7B is a diagram illustrating the side bar 620, the first companion window 710, and a second companion window 720 displayed on the UI unit 120 of the tablet device 24, according to an embodiment of the present general inventive concept. However, a layout of the UI unit 120 in FIG. 7B is only an example for convenience of description, and is not limited thereto.

The side bar 620, the first companion window 710, and the second companion window 720 may be simultaneously displayed in a stepped form, or at least one that is currently used may be displayed. In other words, a layout of the side bar 620, the first companion window 710, and the second companion window 720 is not limited.

The input unit 122 receives an input regarding the selecting of the printing application 701 from the user 10.

When the printing application 701 is selected in the first companion window 710, the processor 110 activates the second companion window 720 to provide a preview of the content or printing options 705 settable in the content. The display unit 124 displays the UI screen of the printing application 701 providing such a preview or printing options 705 on the second companion window 720.

Although not shown in FIG. 7B, the display unit 124 may additionally display the list of image forming apparatuses 30 capable of printing the content or a menu to discover another printable image forming apparatus on the second companion window 720.

When the setting of the printing options 705 is completed, the user 10 may click a print button 707 to instruct the image forming apparatus 30 to print out the content.

Figure 8A:
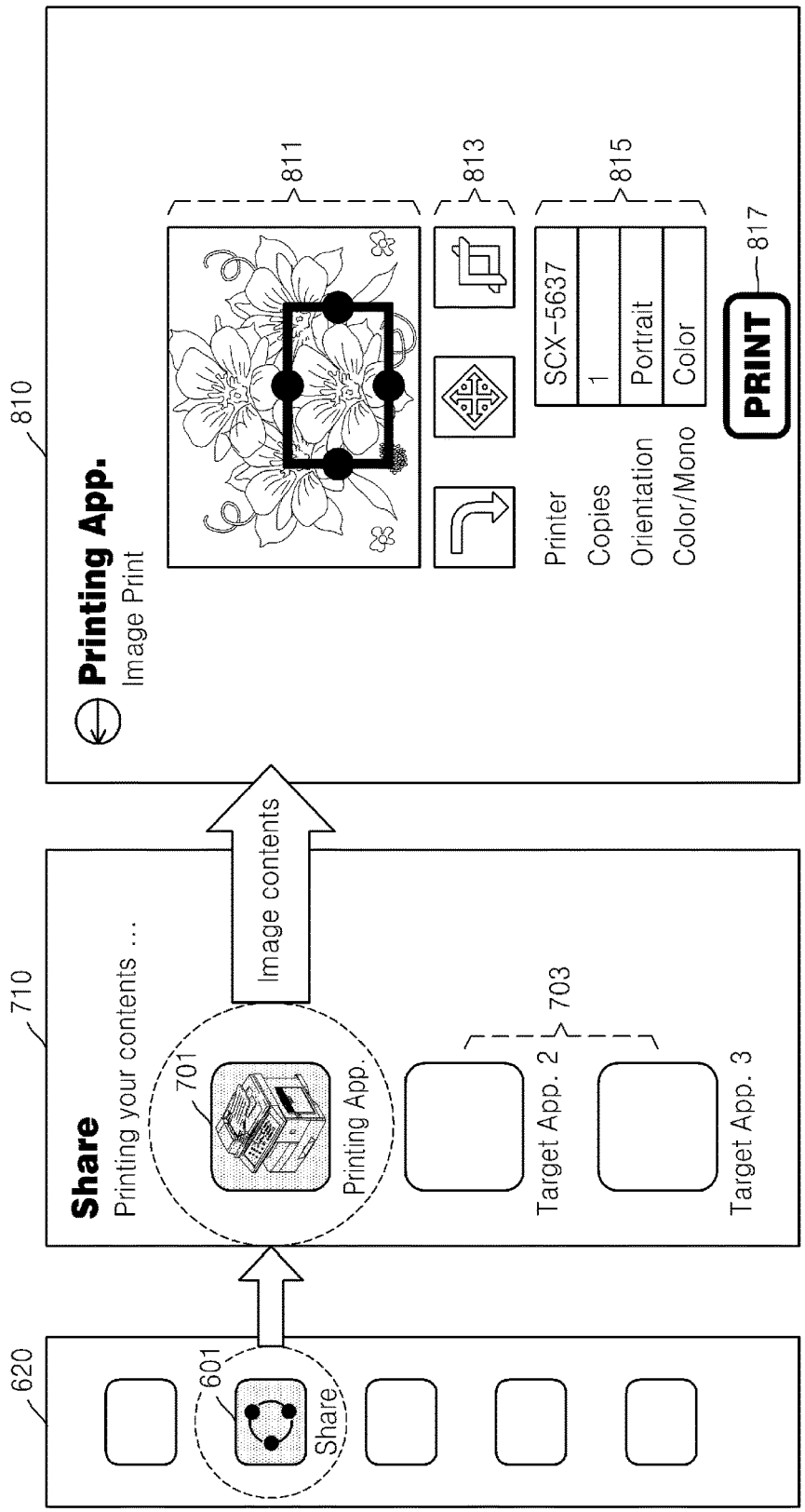
FIGS. 8A and 8B are diagrams of a UI screen of a printing application to provide different printing options according to a type of at least one content through a second companion window of a tablet device, according to an embodiment of the present general inventive concept.
Figure 8B:
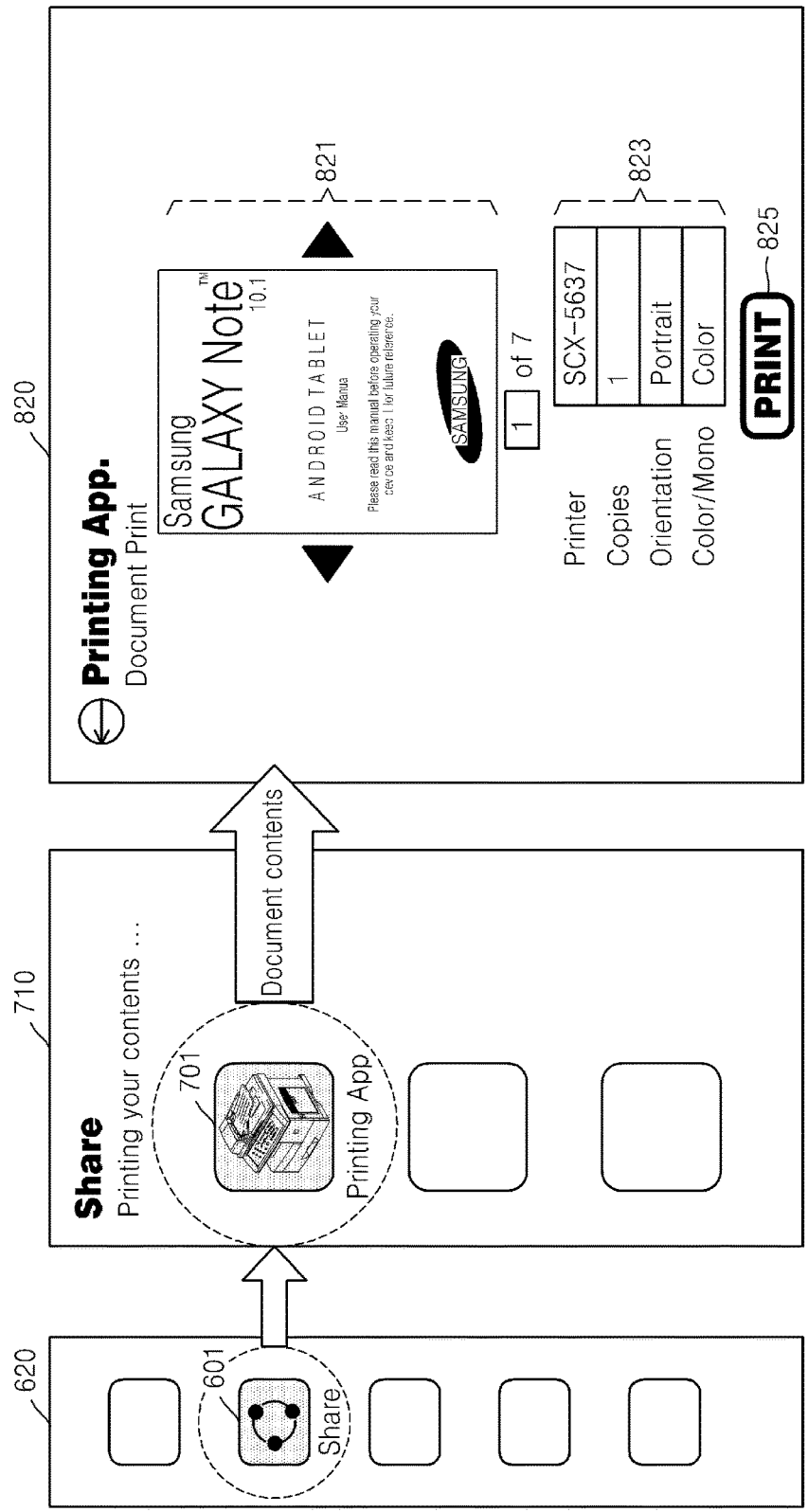

FIGS. 8A and 8B are diagrams illustrating second companion windows 810 and 820 of the printing application 701 providing through the second companion window 720 of the tablet device 24 different printing options according to a type of content, according to an embodiment of the present general inventive concept.

Since layouts illustrated in FIGS. 8A and 8B are only examples illustrated for convenience of description, the present general inventive concept is not limited thereto. The side bar 620, the first companion window 710, and the second companion window 810 or 820 may be simultaneously displayed in a stepwise form, or at least one that is currently used may be displayed. In other words, a layout of the side bar 620, the first companion window 710, and the second companion window 810 or 820 is not limited thereto.

Referring to FIG. 8A, the user 10 may want to share at least one image content with the printing application 701.

When a content to be shared is an image content, the printing application 701 of second companion window 810 may provide a preview 811 of the image content, image editing options 813, such as rotating and cropping, and other printing options 815, such as a printer name, the number of copies, an orientation, a color/mono selection, etc. The preview 811 may include at a portion or an entire portion of the image content indicated as a bold line such that the portion can be edited.

However, referring to FIG. 8B, the user 10 may want to share a document content (for example, a manual for Galaxy Note™) with the printing application 701.

When content to be shared is document content, the printing application 701 of the second companion window 820 may provide a preview 821 of the document content and other printing options 823, such as a printer name, the number of copies, an orientation, a color/mono selection, etc. The preview 821 may include one or more indicators to indicate one of pages of the document content indicated as a bold arrow, for example, when a file currently used in the source application includes a number of pages as the document content.

In other words, as illustrated in FIGS. 8A and 8B, the printing application 701 may provide different printing options according to a type of content to be shared on the second companion window 810.

The user 10 may command the image forming apparatus 30 to print out the content by clicking a print button 817 or 825 when setting of the printing options 813, 815, or 823 is completed.

Figure 9:
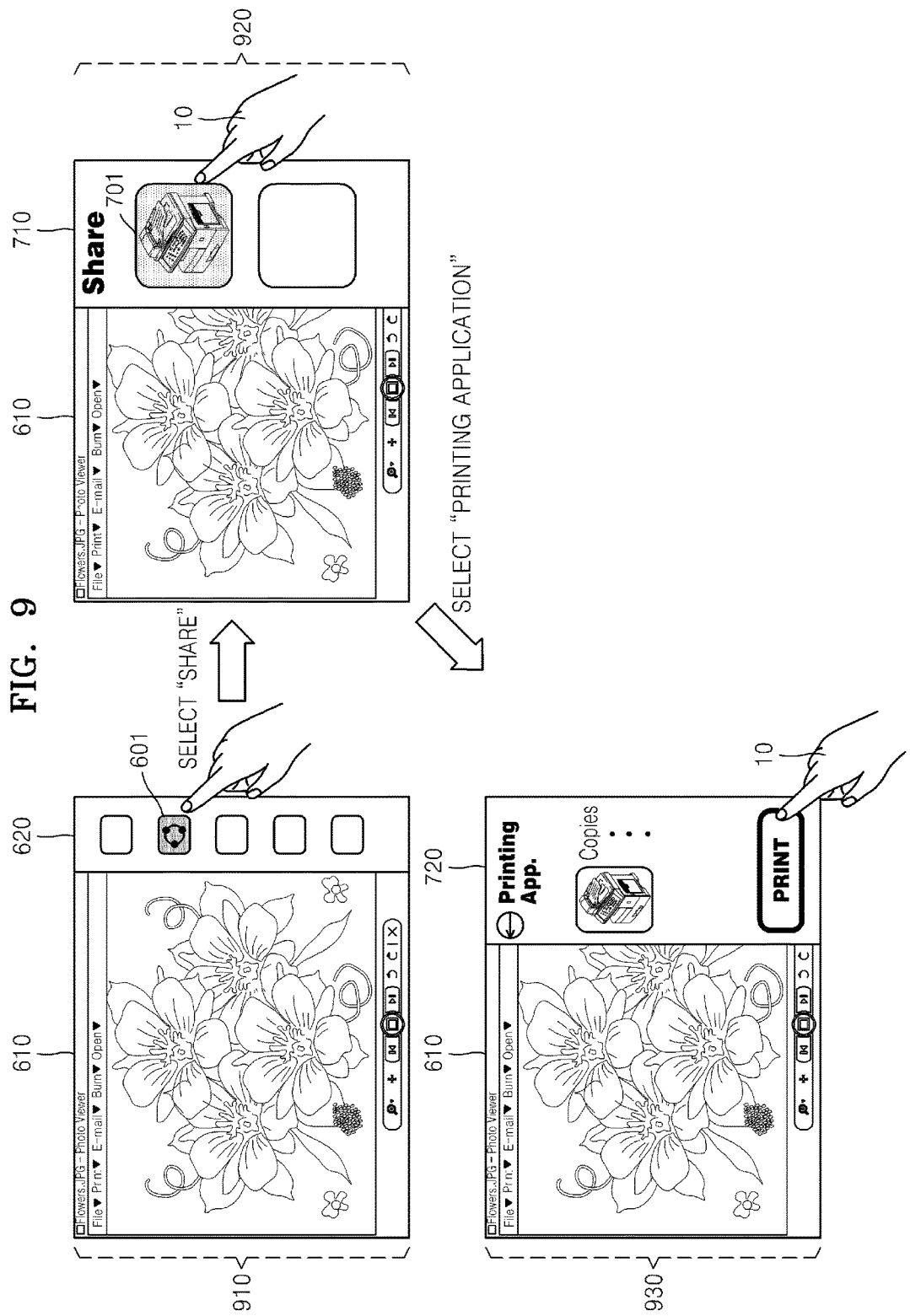
FIG. 9 is a diagram illustrating various screens displayable on a display unit so as to print out at least one content shared between applications in a computing apparatus, according to an embodiment of the present general inventive concept.

FIG. 9 is a diagram illustrating various screens 910, 920, and 930 displayable on the display unit 124 so as to print out a content shared between applications in the computing apparatus 20, according to an embodiment of the present general inventive concept. A layout of FIG. 9 is only an example for convenience of description, and thus the present general inventive concept is not limited thereto.

The screen 910 is similar to a screen of FIG. 6, wherein the user 10 may execute a source application (Photo Viewer) and view image content through the source window 610 of the source application. When the user 10 wants to share the image content with the printing application 701 while viewing the image content through the source window 610, the user 10 inputs a certain gesture. Accordingly, the side bar 620 including the share icon 601 is displayed on the display unit 124.

The screen 920 is similar to a screen of FIG. 7A, wherein the user 10 selects the share icon 601. According to the screen 920, the side bar 620 is closed, and the first companion window 710 providing the printing application 701 capable of sharing the image content is displayed instead.

The screen 930 is similar to a screen of FIG. 7B, wherein the user 10 selects the printing application 701. According to the screen 930, the first companion window 710 is closed, and the second companion window 720 providing a UI screen of a preview or printing options of the printing application 701 is displayed instead.

Meanwhile, in the screens 910 through 930, the source window 610 is continuously activated (displayed). In other words, the companion window 710 or 720 is next to or partially overlaps the source window 610, and the source window 610 is not covered by the companion window 710 or 720 but remains visible.

Referring back to FIG. 3, since the source application 114 (for example, Photo Viewer or MS Word) is continuously used through the source window while the printing application 701 of FIG. 9 is driven through the companion window 710 or 720 of FIG. 9, the user 10 may immediately print out the content being used whichever source application 114 is being used.

Also, after performing the printing operation, the user 10 may immediately get back to the source application 114 that was being used, and thus inconvenience of driving the source application 114 again may be removed.

In addition, even when a document editing application is not installed in the OS 112, the user 10 may check a preview of a document on a web storage unit or on a web to print out the document.

The printing application 701 of FIG. 9 executed only in the companion window 710 or 720 of FIG. 9 may be a light (low-profile) application that has a low process load and uses a small memory region, and thus the user 10 may easily perform the printing operation without interfering with an operation of the source application 114, compared to a heavy (high profile) application, such as a printer drive application. In other words, the user 10 uses the companion window 710 or 720 of FIG. 9 so as to perform the printing operation in an environment different from the case where a printing operation is performed by using a general printer driver.

Also, when the user 10 wants to print content by using the tablet device 24 while moving frequently in a mobile environment, the content may be printed by immediately finding a printer even though a printer driver compatible with a surrounding printer is not installed in the tablet device 24. Thus, the user 10 may easily print the content.

Figure 11:
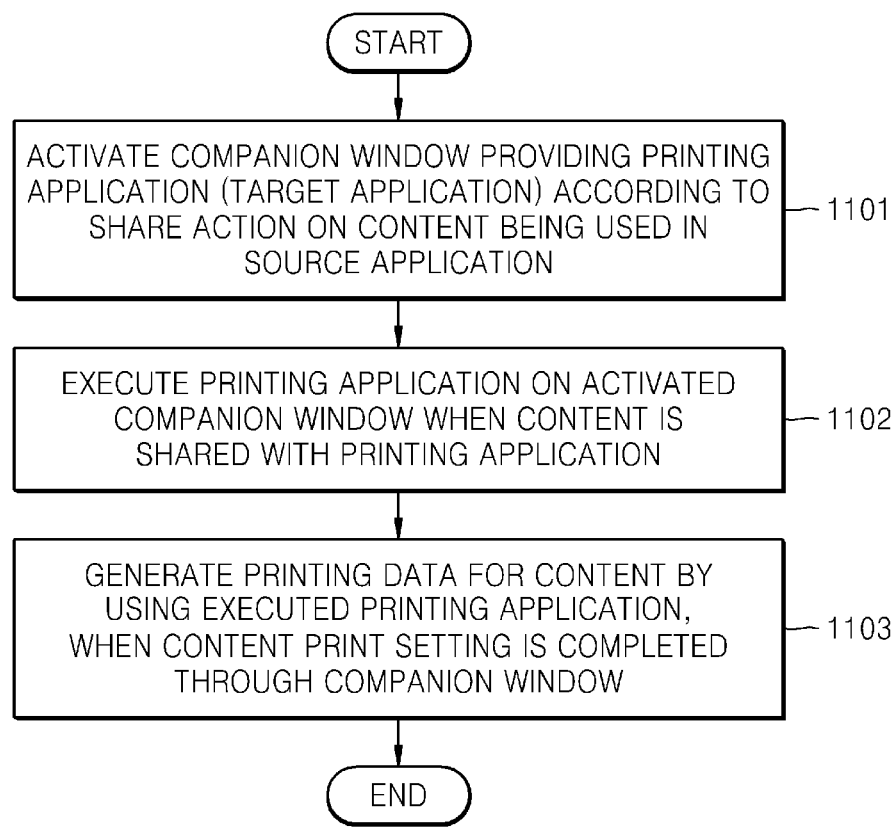
FIG. 11 is a flowchart illustrating a method of printing at least one content shared between applications installed in an OS, according to an embodiment of the present general inventive concept.

FIG. 11 is a flowchart illustrating a method of printing a content shared between applications installed in the OS 112, according to an embodiment of the present general inventive concept. Referring to FIG. 11, the method includes operations processed by the computing apparatus 20 described above with reference to FIGS. 1 through 10. Thus, details described with reference to FIGS. 1 through 10 are also included in the description of the method even if they are omitted hereinbelow.

In operation 1101, the processor 110 controls the OS 112 to activate the companion window to provide the printing application (the target application 116), according to the share action requested to share the content being used by the source application 114. The display unit 124 may display the companion window.

In operation 1102, when the content is shared with the printing application, the processor 110 controls the OS 112 and the printing application so that the printing application is executed on the activated companion window.

In operation 1103, when print setting on the content is competed through the activated companion window, the processor 110 controls the OS 112 and the printing application such that the printing data on the content is generated by using the executed printing application.

FIG. 12 is a flowchart illustrating in detail a method of printing at least one of contents shared between applications installed in the OS 112, according to an embodiment of the present general inventive concept. Referring to FIG. 12, the method includes operations processed in time-series by the computing apparatus 20 described above with reference to FIGS. 1 through 10. Thus, details described with reference to FIGS. 1 through 10 are also included in the description of the method even if they are omitted hereinbelow.

In operation 1201, the input unit 122 receives an input (a share command) to request (or invoke) a share action from the user 10 while content is being used in the source application 114.

In operation 1202, the processor 110 determines whether a type of the content to be shared is mapped to a type of content shareable in a printing application (the target application 116). If the types of content are mapped to each other, the processor 110 performs operation 1203. If the types of content are not mapped to each other, the processor 110 ends the method.

In operation 1203, the display unit 124 displays a preview of the content on a companion window.

In operation 1204, the display unit 124 displays printing options settable on the content on the companion window. The printing options may vary according to the type of content as described above.

In operation 1205, the processor 110 determines whether the image forming apparatus 30 capable of printing the content exists. If the image forming apparatus 30 exists, the display unit 124 displays in the companion window a list of image forming apparatuses 30 capable of printing the content, and performs operation S1207. If not, the processor 110 performs operation 1206.

In operation 1206, the display unit 124 displays a menu for discovering an image forming apparatus capable of printing the content on the companion window.

In operation 1207, the processor 110 determines whether setting of the printing options is completed by the user 10. The processor 110 may determine the completion of the setting based on whether a print button is pressed in the printing application displayed on the companion window. If the setting is completed, the processor 110 performs operation 1208. If not, the processor 110 performs operation 1203 again. When operation 1203 is performed again, the display unit 124 may display a preview updated according to the set printing options.

In operation 1208, the processor 110 may use the printing application to generate the printing data on the content.

As described above, since a smart phone, a tablet device, a laptop computer, or a PC may easily execute a printing application while using various applications, such as Photo Viewer or MS Word, a user may immediately print content being used in whichever application.

Also, since the user may return to an original application that was used immediately after a printing operation is performed, inconvenience of searching and executing the original application may be reduced.

In addition, even when a document editing application is not installed in an OS, the user may check a preview of a document on a web storage unit or on the web, and print the document.

Furthermore, when the user has a smart phone or a tablet device and wants to print the content via the smart phone or tablet device while frequently moving in a mobile environment, the content may be immediately printed out by finding a printer even if a printer driver compatible with a surrounding printer is not installed, and thus, the user may easily print the content. The printer may be compatible with the computing apparatus to receive the print date and print the received print data on a print medium.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of printing through a share function of an operating system (OS), the method comprising:
by at least one processor to execute computer-executable instructions stored in at east one memory to cause:
when executing a source application to use a content in a displayed window, in response to a share action to execute the share function of the OS, activating, by the share function of the OS, a companion window to the window of the source application to display a selectable link corresponding to a printing application, according to a determination that a type of the content corresponds to a type of shareable content registered in association with the source application and to a type of shareable content registered in association with the printing application; and
in response to a selection of the link through the companion window, executing the printing application in the companion window to,
display a print setting through the companion window, according to the type of shared content to complete the print setting to control generation of printing data, when the print setting is completed through the companion window,
discover, through the companion window, an image forming apparatus capable of printing the content according to the print setting, and
in response to a print command through the companion window, generate, according to the completed print setting, the printing data transmittable to a discovered image forming apparatus independent of an image forming apparatus driver associable by the OS with the image forming apparatus, to print the shared content by the image forming apparatus,
wherein the activated companion window includes a user interface (UI) to display, in the activated companion window, a preview of the shared content and the print setting of the image forming apparatus for the shared content, and
the print setting of the image forming apparatus includes different types of printing-options according to the type of the content of the shared content.

2. The method of claim 1, wherein in response to the selection of the link, the share function of the OS performs brokerage of sharing the content between the source application and the printing application.

3. The method of claim 1, further comprising:
in response to setting of the print setting, displaying on the UI the preview of the shared content updated based on the setting of the print setting.

4. The method of claim 1, wherein
the share action to execute the share function of the OS is received while the content is used in the source application, and
the activating the companion window to display the selectable link to the printing application comprises,
determining that the content is shareable to the printing application based on the type of the content, and
in response to the determining that the content is shareable to the printing application, including the selectable link to the printing application in a list of selectable links to target applications to be included in the activated companion window.

5. The method of claim 4, further comprising:
registering, in the OS, at least one content type that is shareable from the source application; and
registering, in the OS, at least one content type that is sharable to the printing application,
wherein, the determining that the content is shareable to the printing application based on the type of the content is based on mapping between the registered at least one content type that is shareable from the source application and the registered at least one content type that is sharable to the printing application.

6. The method of claim 1, wherein:
the companion window comprises:
a first companion window providing the selectable link to the printing application, and
a second companion window provided for executing the printing application associated with the image forming apparatus to display the print setting of the image forming apparatus.

7. The method of claim 1, wherein
the image forming apparatus is from among a plurality of image forming apparatuses, and the executing the printing application associated with the image forming apparatus is based on a selection of the image forming apparatus from among the plurality of image forming apparatus.

8. The method of claim 1, wherein the printing data is generated by rendering the shared content into a printable format by using a component object model (COM).

9. The method of claim 1, further comprising:
executing the printing application associated with the image forming apparatus to transmit the generated printing data to the image forming apparatus.

10. The method of claim 9, further comprising:
when the executing the printing application to transmit the generated printing data is completed, deactivating the activated companion window and ending the executing the printing application.

11. The method of claim 1, wherein the type of content sharable to the printing application comprises a type of content usable in a plurality of source applications installed in the OS.

12. The method of claim 1, wherein:
the activating the companion window comprises simultaneously displaying the companion window along with a window of the source application, next to the window of the source application or by partially overlapping the activated companion window over the window of the source application; and
the source application and the printing application are simultaneously operable.

13. A non-transitory computer-readable medium having recorded thereon a program to execute the method of claim 1.

14. An apparatus to print through a share function of an operating system (OS), the apparatus comprising:
at least one memory to store computer-executable instructions; and
at least one processor to execute the stored instructions to:
when executing a source application to use a content in a displayed window, in response to a share action to execute the share function of the OS, activate, by the share function of the OS, a companion window to the window of the source application to display a selectable link corresponding to a printing application, according to a determination that a type of the content corresponds to a type of shareable content registered in association with the source application and to a type of shareable content registered in association with the printing application; and in response to a selection of the link through the companion window, execute the printing application in the companion window to, display a print setting through the companion window, according to the type of shared content to complete the print setting to control generation of printing data, when the print setting is completed through the companion window, discover, through the companion window, an image forming apparatus capable of printing the content according to the print setting, and in response to a print command through the companion window, generate, according to the completed print setting, the printing data transmittable to a discovered image forming apparatus independent of an image forming apparatus driver in the OS associable with the image forming apparatus, to print the shared content by the image forming apparatus, wherein the activated companion window includes a user interface (UI) to display, in the displayed companion window, a preview of the shared content and the print setting of the image forming apparatus for the shared content, and the print setting of the image forming apparatus includes different types of printing-options settable according to the type of the content types of the shared content.

15. The apparatus of claim 14, wherein in response to setting of the print setting, the at least one processor is to execute the stored instructions to display on the UI the preview of the shared content updated based on the setting of the print setting.

16. The apparatus of claim 14, wherein the at least one processor is to execute the stored instructions to:

receive the share action to execute the share function of the OS to share the content from the source application while the content is used in the source application; and to activate, by the share function of the OS, the companion window includes, determining that the content is shareable to the printing application based on the type of the content, and in response to the determining that the content is shareable to the printing application, including the selectable link to the printing application in a list of selectable links to target applications to be included in the activated companion window.

17. The apparatus of claim 14, wherein:

the image forming apparatus is from among a plurality of image forming apparatuses, and the at least one processor is to execute the stored instructions to execute the printing application associated with the image forming apparatus based on a selection of the image forming apparatus from among the plurality of image forming apparatus.

18. The apparatus of claim 14, wherein the at least one processor is to execute the stored instructions to execute the printing application associated with the image forming apparatus to, in response to the print command, generate, according to the print setting, the printing data transmittable to the image forming apparatus by rendering the shared content into a printable format by using a component object model (COM); and generating the printing data based on the rendering the shared content.

19. The apparatus of claim 14, further comprising:

a network interface hardware to transmit the generated printing data to the image forming apparatus.

20. The apparatus of claim 14, wherein the at least one processor is to execute the stored instructions to:

simultaneously display the companion window and a window of the source application to be next to or partially overlap each other and for the the source application and the printing application to be simultaneously operable.

* * * * *

UNITED STATES PATENT AND TRADEMARK OFFICE
CERTIFICATE OF CORRECTION

PATENT NO. : 10,474,406 B2
APPLICATION NO. : 13/968649
DATED : November 12, 2019
INVENTOR(S) : Jeong-jin Park Page 1 of 1

It is certified that error appears in the above-identified patent and that said Letters Patent is hereby corrected as shown below:

In the Claims

In Column 21, Line 9, in Claim 1, delete "east" and insert -- least --, therefor.

In Column 24, Line 37, in Claim 20, delete "the the" and insert -- the --, therefor.

Signed and Sealed this
Eleventh Day of February, 2020

Andrei Iancu
*Director of the United States Patent and Trademark Office*